(12) United States Patent
Asplund

(10) Patent No.: US 8,422,260 B2
(45) Date of Patent: Apr. 16, 2013

(54) ARRANGEMENT FOR VOLTAGE CONVERSION

(75) Inventor: Gunnar Asplund, Ludvika (SE)

(73) Assignee: ABB Technology AG, Zurich (CH)

( * ) Notice: Subject to any disclaimer, the term of this patent is extended or adjusted under 35 U.S.C. 154(b) by 288 days.

(21) Appl. No.: 12/991,161

(22) PCT Filed: May 6, 2008

(86) PCT No.: PCT/EP2008/055524
§ 371 (c)(1),
(2), (4) Date: Dec. 2, 2010

(87) PCT Pub. No.: WO2009/135523
PCT Pub. Date: Nov. 12, 2009

(65) Prior Publication Data
US 2011/0069517 A1    Mar. 24, 2011

(51) Int. Cl.
*H02M 7/537* (2006.01)

(52) U.S. Cl.
USPC .......................................... 363/131; 363/55

(58) Field of Classification Search ............ 363/55, 363/56.01, 56.02, 71, 72, 131, 132, 135, 363/136
See application file for complete search history.

(56) References Cited

U.S. PATENT DOCUMENTS

| 5,355,296 A | 10/1994 | Kuo et al. |
| 6,519,169 B1* | 2/2003 | Asplund et al. ............... 363/132 |
| 8,138,623 B2* | 3/2012 | Rofougaran ..................... 307/3 |
| 2008/0205093 A1 | 8/2008 | Davies et al. |
| 2008/0232145 A1* | 9/2008 | Hiller et al. ................ 363/56.01 |
| 2008/0259661 A1* | 10/2008 | Hiller et al. ..................... 363/71 |

FOREIGN PATENT DOCUMENTS

| DE | 101 03 031 A1 | 7/2002 |
| WO | WO 2007/023064 A1 | 3/2007 |
| WO | WO 2007/028349 A1 | 3/2007 |

OTHER PUBLICATIONS

Leelaruji, "Availability Assessment of HVDC Converter Transformers Using Markov Modeling", Master Thesis, Apr. 2007, pp. 16-26.

* cited by examiner

*Primary Examiner* — Nguyen Tran
(74) *Attorney, Agent, or Firm* — Birch, Stewart, Kolasch & Birch, LLP

(57) ABSTRACT

An arrangement for converting direct voltage into alternating voltage and conversely has a Voltage Source Converter with at least one phase leg connected to opposite poles (5, 6) of a direct voltage side of the converter and a series connection of switching cells arranged between said poles. Each half (8, 9) of this series connection is connected to a mid point forming a phase output by a phase reactor. The phase reactors of a said phase leg are built in a transformer (30) configured to connect said phase output to an alternating voltage phase line (28) by forming a primary winding each of the transformer arranged to interact with a secondary winding thereof connected to the alternating voltage phase line.

19 Claims, 4 Drawing Sheets

ARRANGEMENT FOR VOLTAGE CONVERSION

TECHNICAL FIELD OF THE INVENTION AND BACKGROUND ART

The present invention relates to an arrangement for converting direct voltage into alternating voltage and conversely, said arrangement comprising on one hand a Voltage Source Converter having at least one phase leg connecting to opposite poles of a direct voltage side of the converter and comprising a series connection of switching cells, each said switching cell having on one hand at least two semiconductor assemblies connected in series and having each a semiconductor device of turn-off type and a free-wheeling diode connected in parallel therewith and on the other at least one energy storing capacitor as well as two terminals connecting the cell to adjacent cells in said series connection of switching cells, a mid point of said series connection of switching cells forming a phase output being configured to be connected to an alternating voltage side of the converter, each said switching cell being configured to obtain two switching states by control of said semiconductor devices of each switching cell, namely a first switching state and a second witching state, in which the voltage across said at least one energy storing capacitor and a zero voltage, respectively, is supplied across said two terminals of the switching cell, for obtaining a determined alternating voltage on said phase output, in which for each half of said series connection of switching cells an inductance means in the form of a phase reactor is arranged to connect said half to said mid point, and on the other for each said phase leg a transformer configured to connect said phase output to an alternating voltage phase line associated with said phase leg.

Such converters with any number of said phase legs are comprised, but they have normally three such phase legs for having a three phase alternating voltage on the alternating voltage side thereof.

An arrangement with a Voltage Source Converter of this type may be used in all kinds of situations, in which direct voltage is to be converted into alternating voltage and conversely, in which examples of such uses are in stations of HVDC-plants (High Voltage Direct Current), in which direct voltage is normally converted into a three-phase alternating voltage or conversely, or in so-called back-to-back stations in which alternating voltage is firstly converted into direct voltage and this is then converted into alternating voltage. However, the present invention is not restricted to these applications, but other applications are also conceivable, such as in different types of drive systems for machines, vehicles etc.

A Voltage Source Converter of the type used in said arrangement is known through for example DE 101 03 031 A1 and WO 2007/023064 A1 and is as disclosed there normally called a multi-cell converter or M2LC. Reference is made to these publications for the functioning of a converter of this type. Said switching cells of the converter may have other appearances than those shown in said publications, and it is for instance possible that each switching cell has more than one said energy storing capacitor, as long as it is possible to control the switching cell to be switched between the two states mentioned in the introduction.

The present invention is primarily, but not exclusively, directed to such arrangements with Voltage Source Converters configured to transmit high powers, and the case of transmitting high powers will for this reason mainly be discussed hereinafter for illuminating but not in any way restricting the invention thereto. When such a Voltage Source Converter is used to transmit high powers this also means that high voltages are handled, and the voltage of the direct voltage side of the converter is determined by the voltages across said energy storing capacitors of the switching cells. This means that a comparatively high number of such switching cells are to be connected in series for a high number of semiconductor devices, i.e. said semiconductor assemblies, are to be connected in series in each said switching cell, and a Voltage Source Converter of this type is particularly interesting when the number of the switching cells in said phase leg is comparatively high. A high number of such switching cells connected in series means that it will be possible to control these switching cells to change between said first and second switching state and by that already at said phase output obtain an alternating voltage being very close to a sinusoidal voltage. This may be obtained already by means of substantially lower switching frequencies than typically used in known Voltage Source Converters of the type shown in FIG. 1 in DE 101 03 031 A1 having switching cells with at least one semiconductor device of turn-off type and at least one free-wheeling diode connected in anti-parallel therewith. This makes it possible to obtain substantially lower losses and also considerably reduces problems of filtering and harmonic currents and radio interferences, so that equipment therefore may be less costly.

Said phase reactors connecting each half of the series connection of switching cells of a phase leg to said mid point are arranged for avoiding short-circuiting of these two halves and also contribute to a better shape of the voltage on the alternating voltage side of the converter.

Said transformer connecting the phase output of each phase to an alternating voltage phase line is arranged for obtaining appropriate levels of the voltages on the direct voltage side and the alternating voltage side of the converter, and the transformer is normally configured to raise the level of the voltage on the direct voltage side with respect to that on the alternating voltage side, but the opposite is also conceivable.

Arrangements of the type defined in the introduction are comparatively space demanding, and there is an ongoing attempt to reduce this demand of space, especially where such arrangements are to be used where space is very expensive, such as offshore.

SUMMARY OF THE INVENTION

The object of the present invention is to provide an arrangement of the type defined in the introduction which addresses the problem of the high space demand of such arrangements already known.

This object is according to the invention obtained by providing such an arrangement in which said phase reactors of a said phase leg are built in said transformer by forming a primary winding each of the transformer arranged to interact with a secondary winding thereof connected to said alternating voltage phase line, and said two primary windings are so located with respect to each other that a dc component of a current flowing through said phase output runs in substantially opposite directions through these two primary windings.

By using said phase reactors as windings of a transformer with two primary windings per phase the phase reactors will in fact disappear by being a part of the transformer, so that the Voltage Source Converter may be connected directly to the transformer without any intermediate phase reactors. This results in a considerable saving of space, since the phase reactors of voltage source converters of this type (M2LC) need quite some space. Accordingly, this constitutes a great advantage when using such an arrangement where space is very expensive, such as offshore.

By arranging the two primary windings so that a dc component of a current flowing through said phase output runs in substantially opposite directions through these two primary windings these phase reactors may be built in into the transformer, since this arrangement means that no saturation of a core of the transformer will then result as a consequence of said dc component of the current.

It is pointed out that "primary winding" and "secondary winding" are not used for indicating how the transformation of the voltage takes place, but the relation of the number of turns of these windings may be any suitable, and the number of turns in the primary windings may be lower just as well as higher than the number of the turns of the secondary winding.

According to an embodiment of the invention said two primary windings are arranged substantially in parallel with each other.

According to another embodiment of the invention said two primary windings extend in the longitudinal direction thereof between two planes in common being substantially perpendicular to the longitudinal extension of the primary windings, which means that the influence of said dc component of the current upon the transformer core will be a minimum.

According to another embodiment of the invention said secondary winding of each transformer is arranged in parallel with and beside the two primary windings.

According to another embodiment of the invention said secondary winding of each transformer is arranged substantially in parallel with said two primary windings in the middle of them, which may be advantageous in some applications from the space demand point of view.

According to another embodiment of the invention the number of the switching cells of said phase leg is $\geq 4$, $\geq 12$, $\geq 30$ or $\geq 50$. The use of a Voltage Source Converter of this type is, as already mentioned above, particularly interesting when the number of switching cells of a said phase leg is rather high resulting in a high number of possible levels of the voltage pulses delivered on said phase output, and the removal of said phase reactors will result in a higher gain of space the higher said number is.

According to another embodiment of the invention said semiconductor devices of the switching cell assemblies are IGBTs (Insulated Gate Bipolar Transistor), IGCTs (Integrated Gate Commutated Thyristor) or GTOs (Gate Turn-Off thyristor). These are suitable semiconductor devices for such converters, although other semiconductor devices of turn-off type are also conceivable.

According to another embodiment of the invention said arrangement is configured to have said direct voltage side of the converter connected to a direct voltage network for transmitting High Voltage Direct Current (HVDC) and the alternating voltage side connected to an alternating voltage phase line belonging to an alternating voltage network. This is due to the high number of semiconductor assemblies required a particularly interesting application of a converter of this type.

According to another embodiment of the invention the converter is configured to have a direct voltage across said two poles being 1 kV-1200 kV, 10 kV-1200 kV or 100 kV-1200 kV. The invention is the more interesting the higher said direct voltage is.

The invention also relates to a plant for transmitting electric power according to the appended claim therefore. The stations of such a plant may be given attractive dimensions and a high reliability to a low cost.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings:

FIG. 7 is a schematic view of a part of the arrangement according to FIG. 6, FIG. 8 shows schematically a way of modifying the part of the arrangement according to the invention shown in FIG. 7, and FIG. 9 is a view corresponding to FIG. 5 of the arrangement according to the present invention shown in FIG. 5.

DETAILED DESCRIPTION OF EMBODIMENTS OF THE INVENTION

Figure 1:
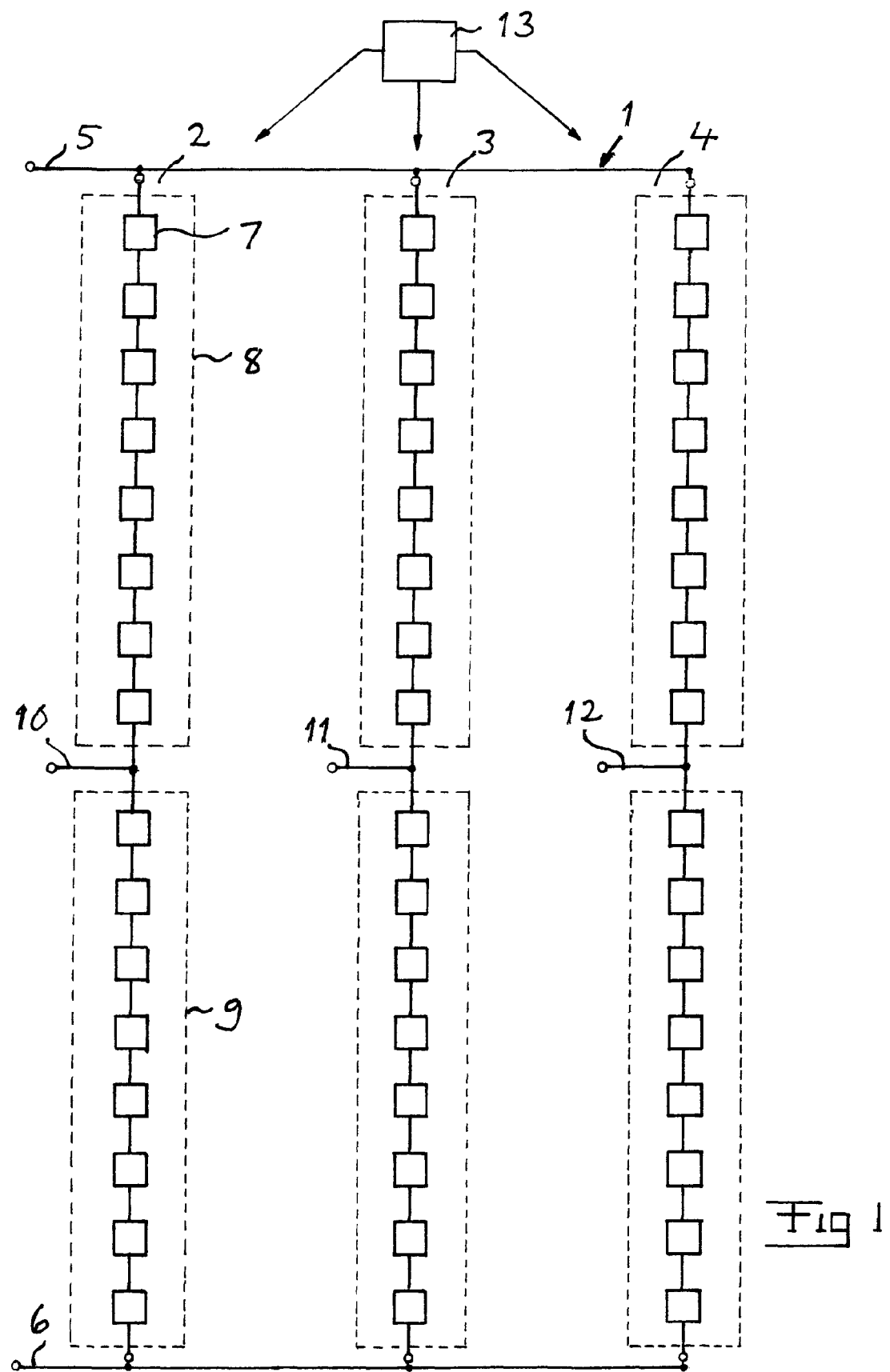
FIG. 1 is a very simplified view of a Voltage Source Converter used in an arrangement according to the present invention.

FIG. 1 illustrates very schematically the general construction of a Voltage Source Converter 1 of the type included in an arrangement to which the present invention relates. This converter has three phase legs 2-4 connected to opposite poles 5, 6 of a direct voltage side of the converter, such as a direct voltage network for transmitting high voltage direct current. Each phase leg comprises a series connection of switching cells 7 indicated by boxes, in the present case 16 to the number, and this series connection is divided into two equal parts, an upper valve branch 8 and a lower valve branch 9, separated by a mid point 10-12 forming a phase output being configured to be connected to an alternating voltage side of the converter. The phase outputs 10-12 may possibly through a transformer connect to a three phase alternating voltage network, load, etc. Filtering equipment is also arranged on said alternating voltage side for improving the shape of the alternating voltage on said alternating voltage side.

A control arrangement 13 is arranged for controlling the switching cells 7 and by that the converter to convert direct voltage into alternating voltage and conversely.

Figure 2:
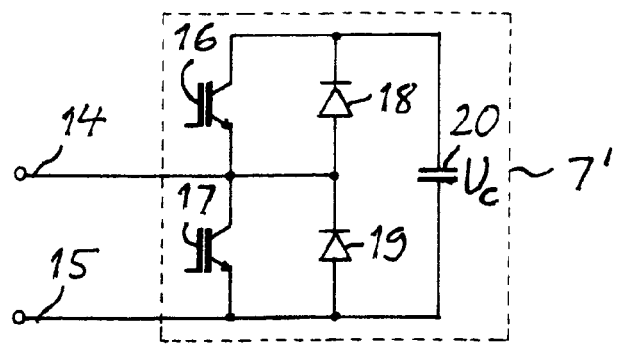
FIGS. 2 and 3 illustrate two different known switching cells, which may be a part of the Voltage Source Converter in an arrangement according to the invention.
Figure 3:
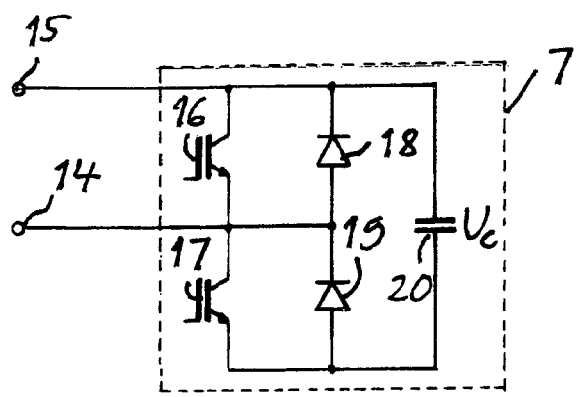

The Voltage Source Converter has switching cells 7 of the type having on one hand at least two semiconductor assemblies with each a semiconductor device of turn-off type, and a free-wheeling diode connected in parallel therewith and on the other at least one energy storing capacitor, and two examples of such switching cells are shown in FIG. 2 and FIG. 3. The terminals 14, 15 of the switching cell are adapted to be connected to adjacent switching cells in the series connection of switching cells forming a phase leg. The semiconductor devices 16, 17 are in this case IGBTs connected in parallel with diodes 18, 19. Although only one semiconductor device and one diode is shown per assembly these may stand for a number of semiconductor devices and diodes, respectively, connected in parallel for sharing the current flowing through the assembly. An energy storing capacitor 20 is connected in parallel with the respective series connection of the diodes and the semiconductor devices. One terminal 14 is connected to the mid point between the two semiconductor devices as well as the mid point between the two diodes. The other terminal 15 is connected to the energy storing capacitor 20, in the embodiment of FIG. 2 to one side thereof and in the embodiment according to FIG. 3 to the other side thereof. It is pointed out that each semiconductor device and each diode as shown in FIG. 2 and FIG. 3 may be more than one connected in series for being able to handle the voltages to be handled, and the semiconductor devices so connected in series may then be controlled simultaneously so as to act as one single semiconductor device.

The switching cells shown in FIG. 2 and FIG. 3 may be controlled to obtain one of a) a first switching state and b) a second switching state, in which for a) the voltage across the capacitor 20 and for b) a zero voltage is applied across the terminals 14, 15. For obtaining the first state in FIG. 2 the semiconductor device 16 is turned on and the semiconductor device 17 turned off and in the embodiment according to FIG. 3 the semiconductor device 17 is turned on and the semiconductor 16 is turned off. The switching cells are switched to the second state by changing the state of the semiconductor devices, so that in the embodiment according to FIG. 2 the semiconductor device 16 is turned off and 17 turned on and in FIG. 3 the semiconductor device 17 is turned off and 16 turned on.

Figure 4:
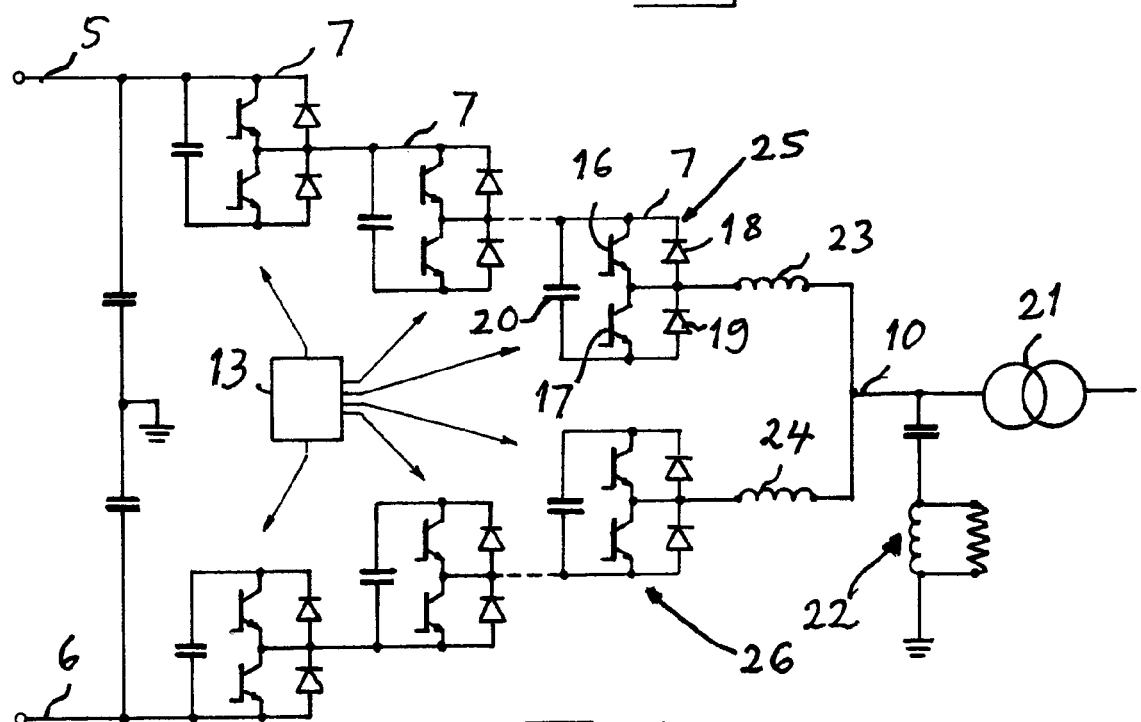
FIG. 4 is a simplified view very schematically illustrating a known arrangement of the type according to the present invention with respect to one phase leg.

FIG. 4 shows a little more in detail how a phase leg of the converter according to FIG. 1 is formed by switching cells of the type shown in FIG. 3, in which totally ten switching cells have been left out for simplifying the drawing. The control arrangement 13 is adapted to control the switching cells by controlling the semiconductor devices thereof, so that they will either deliver a zero voltage or the voltage across the capacitor to be added to the voltages of the other switching cells in said series connection. A transformer 21 and filtering equipment 22 are here also indicated. It is shown how each valve branch is through a phase reactor 23, 24 connected to the phase output 10, and such phase reactors should also be there in FIG. 1 for the phase outputs 10, 11 and 12, but have there been left out for simplifying the illustration. These phase reactors are needed for avoiding short-circuiting between the upper half 25 and the lower half 26 of the series connection of switching cells.

Figure 5:
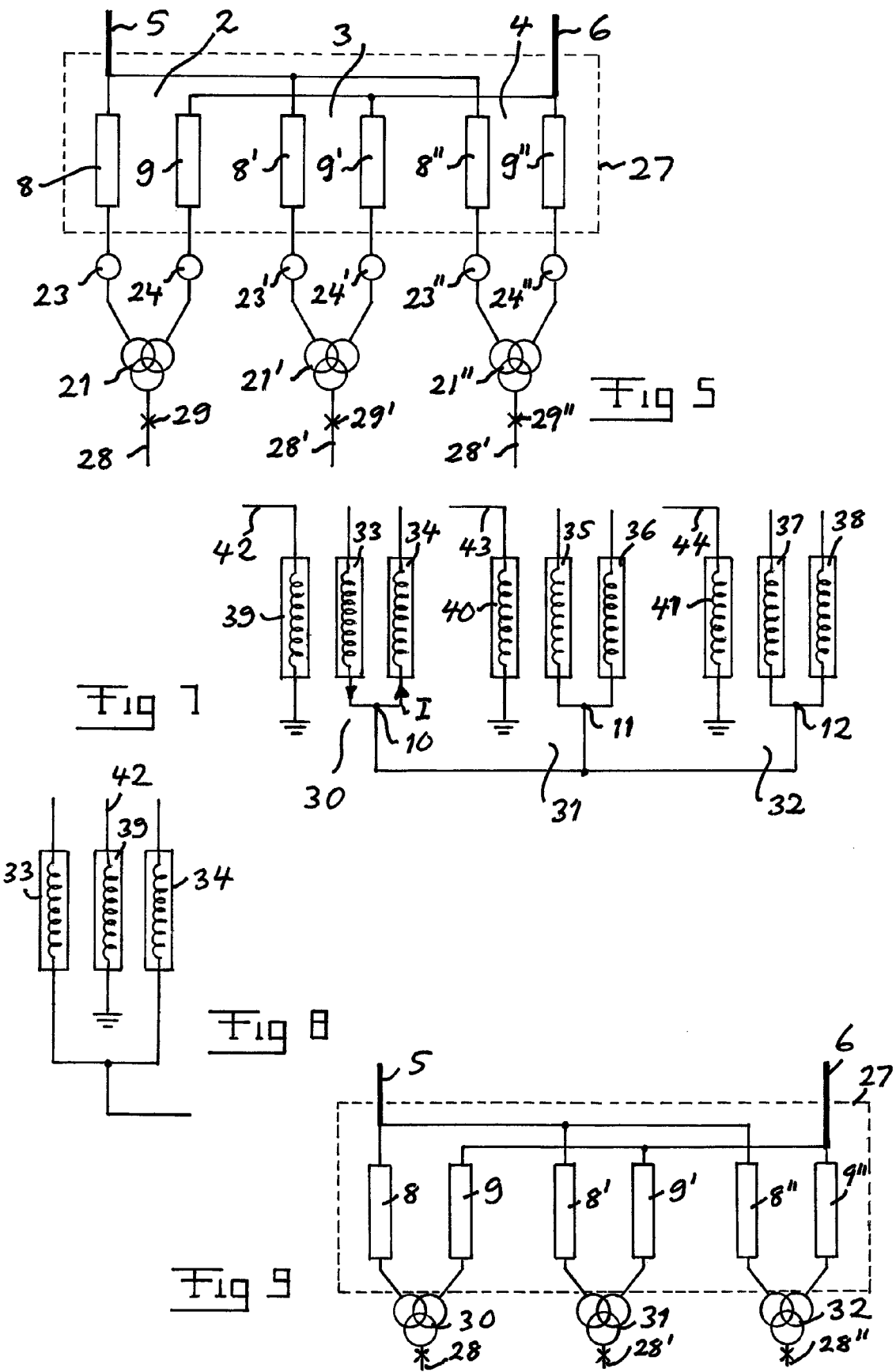
FIG. 5 is a further simplified view of the arrangement shown in FIG. 4.

The arrangement for converting direct voltage into alternating voltage and conversely according to FIG. 4 is more schematically illustrated in FIG. 5 for three phase legs 2-4 in which the upper valve branch of the different phase legs is indicated by 8, 8' and 8", whereas the lower valve branch is indicated by 9, 9' and 9". A building in the form of a valve hall housing these valves formed by the series connection of switching cells is indicated by 27. Phase reactors requiring considerable space and arranged outside said building 27 are indicated by 23, 23' and 23" as well as 24, 24' and 24". These phase reactors connect the respective said valve branch to a transformer 21, 21' and 21", respectively, connected to an alternating voltage phase line 28, 28', 28" through a breaker 29, 29', 29". Thus, said space demanding phase reactors and transformers have to be arranged outside said building requiring a considerable extra space available therefor outside the building.

Figure 6:
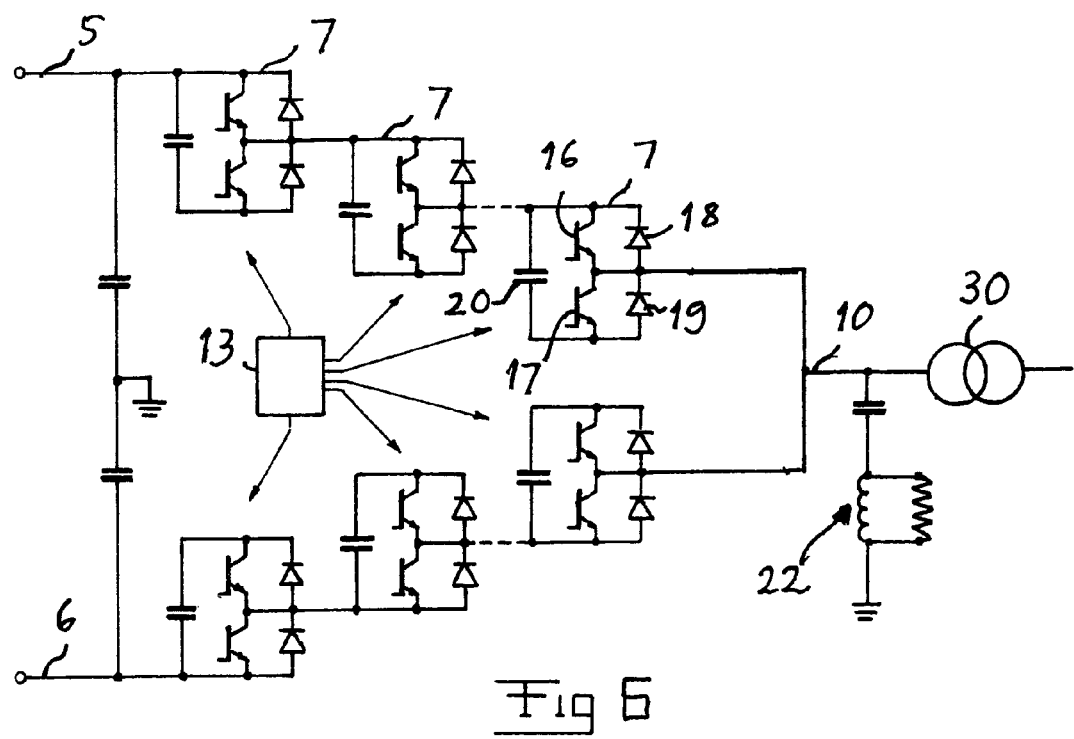
FIG. 6 is a view corresponding to FIG. 4 of an arrangement according to an embodiment of the present invention.

FIG. 6 illustrates very schematically, for one phase leg, an arrangement according to an embodiment of the present invention, which has no separate phase reactors, but the transformer 30 has instead two windings on the direct voltage side thereof per phase.

FIG. 7 illustrates how this may be achieved. The three transformers, one per phase, are here schematically illustrated, but these may also be considered to constitute one single three-phase transformer. Each transformer 30-32 has two primary windings 33-38 each connecting one half of said series connection of switching cells or valve branch to a said mid point 10-12.

The two primary windings of the transformer of a phase leg are arranged so that a dc component of a current flowing through the mid point in question while flowing from the positive direct voltage pole to the negative one runs in substantially opposite directions through these two primary windings. This is illustrated at I for the transformer 30. This means that this dc component will not saturate the iron of the transformer core, which is essential for enabling a building in of the phase reactor in the transformer in this way.

Each transformer has a secondary winding 39-41 connecting to the respective alternating voltage phase line 42-44.

The two primary windings of each transformer are arranged to extend substantially in parallel with each other with the secondary winding extending substantially in parallel therewith and arranged beside them.

FIG. 8 illustrates another possibility to arrange the windings of a transformer of the type shown in FIG. 7, in which the secondary winding 39 is arranged in the middle between the two primary windings 33, 34.

The benefits of an arrangement according to the invention with respect to saving of place is illustrated in FIG. 9, which is a view corresponding to FIG. 5 of an arrangement according to the present invention, which accordingly has no phase reactors, but instead two primary windings included in the transformers 30-32. Accordingly, an arrangement of this design will be attractive where space is very expensive, such as offshore.

The invention is of course not in any way restricted to the embodiments described above, but many possibilities to modifications thereof will be apparent to a person with ordinary skill in the art without departing from the basic idea of the invention as defined in the appended claims.

The invention claimed is:

1. An arrangement connected to a direct voltage network for transmitting high voltage direct current, said arrangement being provided for converting direct voltage into alternating voltage and conversely, said arrangement comprising:
   a multi-cell Voltage Source Converter having:
      at least one phase leg connected to opposite poles of a direct voltage side of the converter and comprising a series connection of switching cells, each switching cell having at least one energy storing capacitor as well as two terminals respectively connected to two immediately adjacent switching cells in said series connection of switching cells, a mid point of said series connection of switching cells dividing said series connection of switching cells into two halves of said series connection of switching cells and forming a phase output being configured to be connected to an alternating voltage side of the converter, and
      for each half of said series connection of switching cells, an inductance device in the form of a phase reactor arranged to connect a corresponding one of the two halves of said series connection of switching cells to said mid point, and a transformer, for each of the at least one phase leg, configured to connect said phase output to an alternating voltage phase line associated with said phase leg, the transformer including two primary windings and a secondary winding, wherein said phase reactors of the at least one phase leg are built in in said transformer by using the two primary windings of the transformer, each of the two primary windings connects a corresponding one of the two halves of said series connection of switching cells to the mid point, each of the two primary windings of the transformer is arranged to interact with the secondary winding of the transformer that is connected to said alternating voltage phase line, and said two primary windings are so located with respect to each other such that a dc component of a current flowing from one of said poles to the other of said poles through said mid point flows in substantially opposite directions through the two primary windings.

2. The arrangement according to claim 1, wherein said two primary windings are arranged substantially in parallel with each other.

3. The arrangement according to claim 1, wherein said two primary windings extend in the longitudinal direction thereof between two planes in common being substantially perpendicular to the longitudinal extension of the primary windings.

4. The arrangement according to claim 1, wherein said secondary winding of the transformer is arranged in parallel with said two primary windings and outside of a space between said two primary windings.

5. The arrangement according to claim 1, wherein said secondary winding of the transformer is arranged substantially in parallel with said two primary windings and within a space between said two primary windings.

6. The arrangement according to claim 1, wherein the number of the switching cells of said phase leg is $\geq 4$, $\geq 12$, $\geq 30$ or $\geq 50$.

7. The arrangement according to claim 1, wherein semiconductor devices of the switching cell assemblies are IGBTs (Insulated Gate Bipolar Transistor), IGCTs (Integrated Gate Commutated Thyristor) or GTOs (Gate Turn-Off Thyristor).

8. The arrangement according to claim 1, wherein it is configured to have said direct voltage side of the converter connected to said direct voltage network for transmitting High Voltage Direct Current (HVDC) and the alternating voltage side connected to an alternating voltage phase line belonging to an alternating voltage network.

9. The arrangement according to claim 1, wherein said Voltage Source Converter is configured to have a direct voltage across said two poles being 1 kV-1200 kV, 10 kV-1200 kV or 100 kV-1200 kV.

10. The arrangement according to claim 2, wherein said two primary windings extend in the longitudinal direction thereof between two planes in common being substantially perpendicular to the longitudinal extension of the primary windings.

11. The arrangement according to claim 2, wherein said secondary winding of the transformer is arranged in parallel with and outside a space between said two primary windings.

12. The arrangement according to claim 3, wherein said secondary winding of the transformer is arranged in parallel with said two primary windings and outside of a space between said two primary windings.

13. The arrangement according to claim 2, wherein said secondary winding of the transformer is arranged substantially in parallel with said two primary windings and within a space between said two primary windings.

14. The arrangement according to claim 3, wherein said secondary winding of the transformer is arranged substantially in parallel with said two primary windings and within a space between said two primary windings.

15. The arrangement according to claim 4, wherein said secondary winding of the transformer is arranged substantially in parallel with said two primary windings and within a space between said two primary windings.

16. The arrangement according to claim 2, wherein the number of the switching cells of said phase leg is $\geq 4$, $\geq 12$, $\geq 30$ or $\geq 50$.

17. The arrangement according to claim 3, wherein the number of the switching cells of said phase leg is $\geq 4$, $\geq 12$, $\geq 30$ or $\geq 50$.

18. The arrangement according to claim 4, wherein the number of the switching cells of said phase leg is $\geq 4$, $\geq 12$, $\geq 30$ or $\geq 50$.

19. The arrangement according to claim 5, wherein the number of the switching cells of said phase leg is $\geq 4$, $\geq 12$, $\geq 30$ or $\geq 50$.

* * * * *